United States Patent
Jupp et al.

(10) Patent No.: US 7,136,453 B2
(45) Date of Patent: Nov. 14, 2006

(54) APPARATUS FOR IMAGING OBJECTS ON THE REMOTE SIDE OF A BARRIER USING RADIATION

(75) Inventors: Ian David Jupp, Salisbury (GB); Tony Carter, Salisbury (GB); Geraint Spencer Dermody, Salisbury (GB); Ian Blair Pleasants, Salisbury (GB); John David Burrows, Salisbury (GB)

(73) Assignee: The Secretary of State for Defence (GB)

( * ) Notice: Subject to any disclaimer, the term of this patent is extended or adjusted under 35 U.S.C. 154(b) by 0 days.

(21) Appl. No.: 10/344,179

(22) PCT Filed: Aug. 2, 2001

(86) PCT No.: PCT/GB01/03486

§ 371 (c)(1),
(2), (4) Date: Jul. 7, 2003

(87) PCT Pub. No.: WO02/12923

PCT Pub. Date: Feb. 14, 2002

(65) Prior Publication Data

US 2004/0028178 A1 Feb. 12, 2004

(30) Foreign Application Priority Data

Aug. 9, 2000 (GB) ................................. 0019451.4

(51) Int. Cl.
*G01N 23/201* (2006.01)
(52) U.S. Cl. ................. 378/87; 378/2; 378/98.6; 250/358.1

(58) Field of Classification Search .................. 378/2, 378/57, 98.6, 62, 86–89; 250/358.1–360.1
See application file for complete search history.

(56) References Cited

U.S. PATENT DOCUMENTS

| 4,191,890 | A | * | 3/1980 | Geluk | 378/2 |
| 4,974,247 | A | | 11/1990 | Friddell | 378/46 |
| 5,237,598 | A | * | 8/1993 | Albert | 378/98.6 |
| 5,568,532 | A | | 10/1996 | Majewski et al. | 378/98.6 |
| 5,763,886 | A | * | 6/1998 | Schulte | 250/358.1 |
| 5,940,468 | A | | 8/1999 | Huang et al. | 378/57 |
| 6,282,260 | B1 | * | 8/2001 | Grodzins | 378/87 |

OTHER PUBLICATIONS

U.S. Appl. No. 60/112,102 —Grodzins, Lee—filed Dec. 14, 1998.*

* cited by examiner

*Primary Examiner*—Edward J. Glick
*Assistant Examiner*—Jurie Yun
(74) *Attorney, Agent, or Firm*—Dean W. Russell; Kilpatrick Stockton LLP

(57) ABSTRACT

Apparatus (1) for imaging an object (4) on the remote side of a barrier (6). The apparatus has source means (2) for scanning the object (4) through the barrier (6) with radiation and mask means (8) having at a least one radiation transparent area wherein the radiation from the source is masked thereby to project on to the object (4) at least one scanning beam of radiation. The apparatus (1) also has detector means (10) for detecting radiation reflected from any scanned point on the object (4) and image generation means for generating an image of the object (4) from the detected radiation.

10 Claims, 2 Drawing Sheets ates for security screening using for example, at airports, passenger hand luggage is screened for explosives articles. Such screening tends to be carried out using shadow techniques. By means of a movable x-ray beam from a continuously driven x-ray source, the luggage may be line scanned from one side. To the other side is a large array of x-ray detectors. Any x-ray impermeable objects within the luggage will cast a shadow on to the arrays. The shadows are converted to screen images which are scrutinised by an operator.

APPARATUS FOR IMAGING OBJECTS ON THE REMOTE SIDE OF A BARRIER USING RADIATION

This application claims priority to Great Britain Application No. 0019451.4 filed on Aug. 9, 2000 and International Application No. PCT/GB01/03486 filed on Aug. 2, 2001 and published in English as International Publication No. WO 02/12923 A1 on Feb. 14, 2002, the entire contents of which are hereby incorporated by reference.

The invention relates to imaging apparatus and particularly to apparatus for imaging objects to the remote side of a barrier.

It is well known to carry out security screening using x-ray apparatus. For example, at airports, passenger hand luggage is screened for explosives articles. Such screening tends to be carried out using shadow techniques. By means of a movable x-ray beam from a continuously driven x-ray source, the luggage may be line scanned from one side. To the other side is a large array of x-ray detectors. Any x-ray impermeable objects within the luggage will cast a shadow on to the arrays. The shadows are converted to screen images which are scrutinised by an operator.

The reverse geometry x-ray (RGX) tube may, for instance, produce a scanning x-ray emission region across a 250 mm diameter tungsten anode. Typically the emission region will be up to 20 μm in diameter and up to 1024×1024 scan positions may be used to define the line scanned region.

X-rays impinging upon an object may undergo Compton scattering. This is the result of interaction between the x-ray photons and the electrons of the object. The x-rays may be scattered at various angles and flux intensities, according to the composition of the object. Some will be back scattered to the side of the object at which the source is located. In our co-pending International Patent Application No. PCT/GB01/03490 we disclose a camera for imaging an object on the remote side of a barrier using back-scattered x-rays.

If back scattered x-rays are to be used for object imaging, but without a camera, what is required is high resolution imaging apparatus for producing high statistical quality images in short exposure times. Also, security personnel have a requirement for a non-invasive system of determining the contents of an item without having to relocate it. For example, unclaimed luggage left on the platform of an underground train station requires explosion threat assessment, but moving the luggage in order to determine its contents is of itself risky. Hence there is a need to be able to determine the contents in situ.

Known back-scatter x-ray screening apparatus is not easily portable, not least because it tends to use a mechanically scanned x-ray beam, necessitating equipment of a size and weight which does not lend itself to portability.

Coded aperture x-ray cameras are well known. These may conventionally have a suitable x-ray detector and a mask situated between the detector and an object under assessment. The mask has x-ray transparent areas arranged in a pre-determined, coded, pattern. X-ray flux from any point source on the object is masked so as to project on to the detector a pattern of flux corresponding to the pattern of the mask. The position of the projected flux pattern is determined by the originating direction of the flux. An image of the object may be reconstructed by decoding the accumulated flux patterns. An example of such an arrangement employing a coded aperture x-ray camera is disclosed in U.S. Pat. No. 5,940,468 (Huang). An exemplary use of an RGX tube is provided by U.S. Pat. No. 5,568,532 (Majewski).

The coded aperture camera has advantages over its forerunner, the single pinhole camera. To maintain high resolution, a single pinhole needs to have as small a diameter as possible. To ensure sufficient sensitivity, the pinhole needs to be as large as possible. Thus, the choice of aperture diameter in a single pinhole camera involves a degree of compromise. However, the coded aperture camera, because it in effect has a pattern of multiple pinholes, achieves both high resolution and sufficient sensitivity.

Coded aperture imaging is used in astronomy.

The invention provides apparatus for imaging an object on the remote side of a barrier comprising mask means having at least one radiation transparent area, source means for projecting at least one scanning beam of radiation onto the object through the mask and the barrier, detector means for detecting radiation scattered from any scanned point on the object, and image generation means for generating an image of the object from the detected radiation.

The scanning is preferably conducted with sufficient resolution to allow a high frequency of sampling of the object. The scanning may be conducted through a two dimensional array of 1024×1024 positions.

Preferably, the mask means has a plurality of radiation transparent areas arranged in a predetermined pattern thereby to project on to the object a plurality of scanning beams of radiation of a predetermined pattern.

The use of a mask having a plurality of radiation transparent areas has the advantage over a single radiation transparent area or pinhole in that it allows maximum flux to reach the object, and thereby reduces the time of exposure required to obtain a statistically significant result, whilst still providing an imaging capability with the resolution of a single pinhole.

The apparatus may be portable, that is to say, it may be of a size and weight which lends itself portability. Individual elements of the apparatus may be portable or the apparatus may be portable as a whole. Portability enables the apparatus to be taken to the location of an object requiring assessment which, as aforementioned, is advantageous in the case of objects requiring elimination as security threats.

The radiation may be back-scattered from the object.

The source means may scan the object with x-ray radiation, that is, radiation in the electromagnetic spectrum of wavelengths less than about 1 Å. The source means may comprise an x-ray raster scan tube or an RGX tube, which has the advantage that it has an electrostatically rather than mechanically scanned x-ray beam, that is less cumbersome.

The detector means may be generally annular and positioned around the source means, and, for the detection of back-scattered x-rays, may comprise a segmented array of a plurality of scintillation crystal elements, typically eight NaI (T1) crystal elements, read out by photomultiplier tubes. Such a detector may provide excellent stopping power at the required x-ray photon energies, typically up to 100 KeV, have a good low energy threshold and may provide sufficient energy resolution to allow the use of energy windowing, that is, detection limited to photons in a selected energy range, which can optimise image quality. In addition, such a detector may provide a large detection area thereby maximising the flux collection process.

If a mask with a plurality of radiation transparent areas is used, the mask pattern is preferably selected, according to a mathematical function, so as to code the scanning beams projected on to the object in a maimer which will result in reflected radiation that can be subsequently decoded.

The image generation means may comprise a system driven by software to decode, by mathematical analysis, the detected radiation, thereby to reconstruct an image of the object. The mathematical analysis may comprise filtered deconvolution, matrix inversion, maximum likelihood/ maximum entropy reconstruction or cross-correlation.

The invention will now be described by way of example, with reference to the drawings in which.

Figure 1:
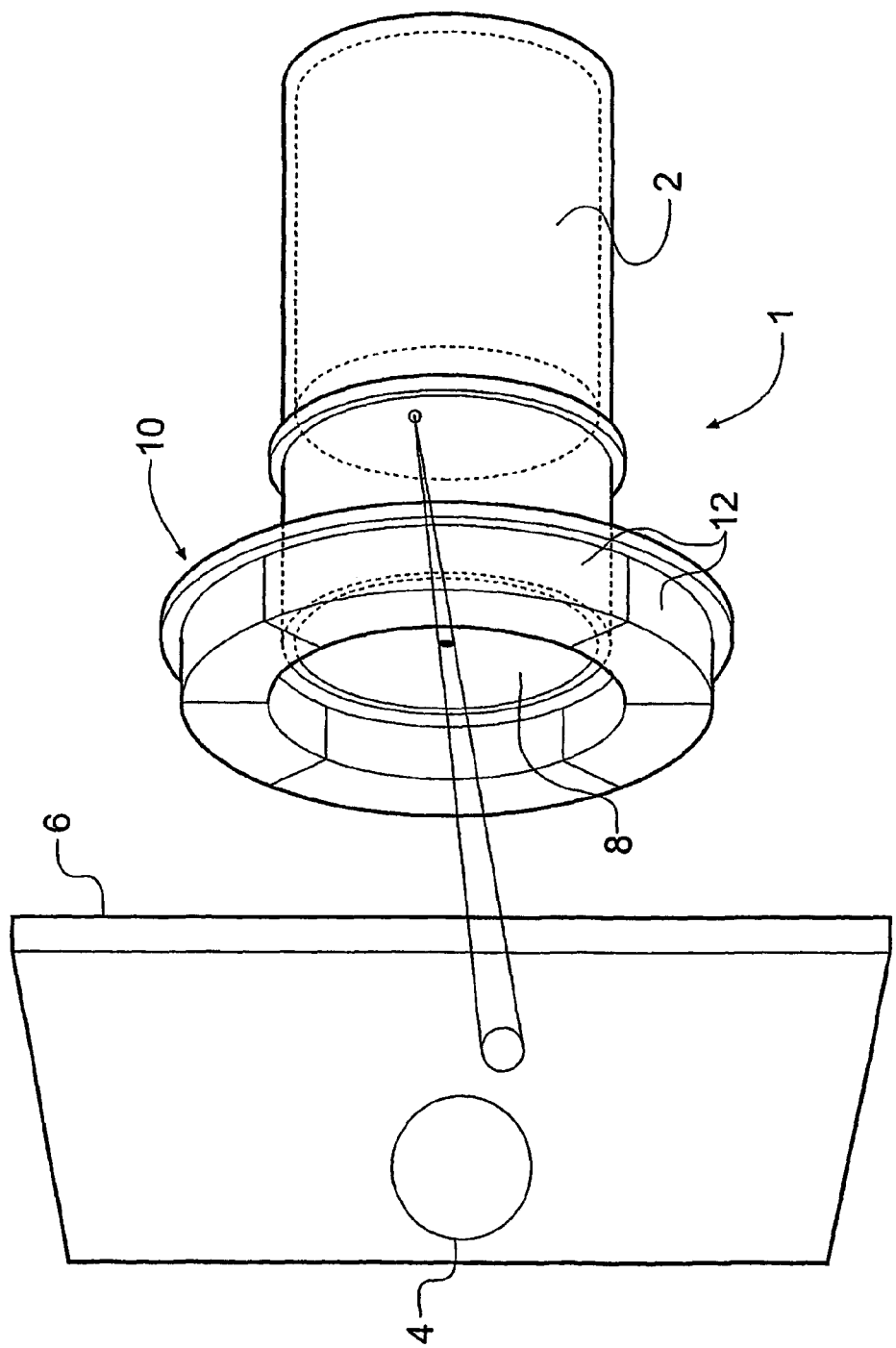
FIG. 1 is a schematic diagram of apparatus according to the invention.

With reference to FIG. 1, an object 4 under assessment is situated to one side of a barrier 6. The object 4 is represented schematically in the figure as a three dimensional body, but could be a gun, a knife, an explosives detonator. The barrier 6 could be the skin of a brief case, suit case etc.

Portable imaging apparatus, indicated generally at 1, is located to the other side of the barrier 6, typically several metres away. The apparatus 1 comprises a source 2, a mask 8 and a detector 10.

The source 2 is a scanning, reverse geometry x-ray (RGX) tube, of the type available in the USA from the company Digiray, nominally 350 mm in diameter and 950 mm in length, which together with its housing and supporting structure (not shown0 weighs approximately 80 Kg. The tube produces x-ray radiation, typically of 300 KeV, that can be electrostatically, that is, using electromagnets, scanned through a two dimensional array of positions, up to a limit, in this case, of 1024×1024.

In a first embodiment, the mask 8 is a single pinhole mask having one x-ray transparent area 2 mm in diameter. The mask 8 is situated between the source 2 and the barrier 6. The flux from the source 2 is interrupted by the mask 8 such that a scanning pencil beam of x-rays is projected through the barrier 6 and the object 4 is illuminated with a single spot (not shown). The spot is scanned through the 1024×1024 positions.

The detector 10 is an annular, large area detector mounted around the RGX tube, and comprises a ring-shaped array of eight NaI (T1) scintillation crystal elements (not shown) whose outputs are monitored by photomultiplier tubes (not shown). The array nominally has an internal diameter of 380 mm and an external diameter of 650 mm. Each element, nominally 250×110×320 mm, weighs approximately 5 Kg.

X-ray photons back scattered from any point on the object 4 which is illuminated by the source 2, and which penetrate through the barrier 6, are detected at the detector 10. The detected intensity is recorded in the image at the corresponding RGX scan position.

Figure 2:
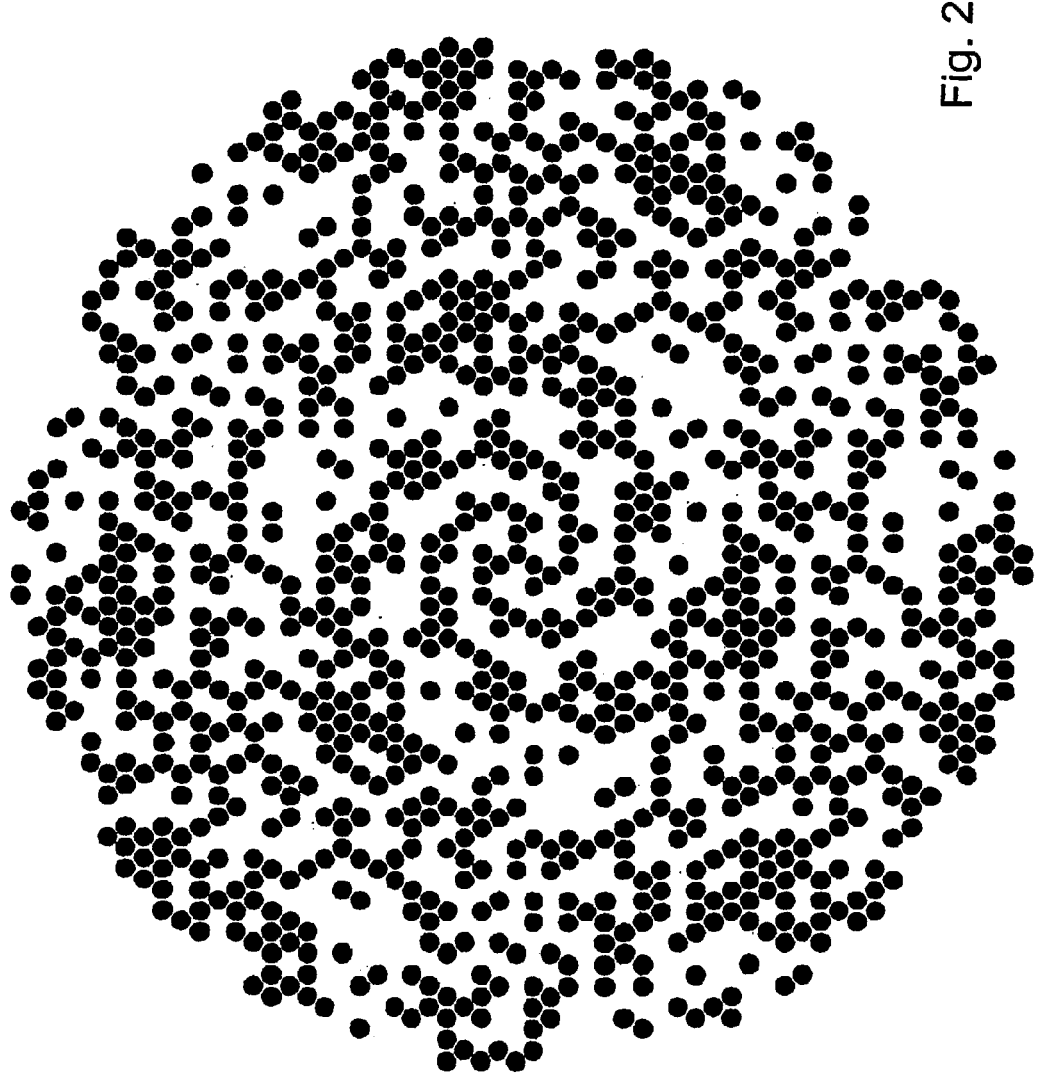
FIG. 2 is a schematic diagram of a typical coded mask pattern.

In a second embodiment of the invention, the single pinhole mask 8 is replaced by a coded aperture mask, that is to say, a hexagonal mask, approximately 300 mm across, having x-ray transparent areas in a pre-determined pattern. The pattern is chosen according to an autocorrelation function of an appropriate form, that is, a delta function. In effect the mask can be considered as an array of, typically 1000 elements, and selected elements, typically 500, are x-ray transparent. FIG. 2 shows typical coded mask patterning.

With the coded aperture mask interrupting the flux, several beams, in a pattern corresponding to the pattern of the radiation transparent areas, result in the object 4 being illuminated with a pattern of spots. As previously, the photons back scattered are detected as the object is scanned. The detections made by the detector 10 are in encoded form and must be decoded in order to produce a useable image. Image generation is performed using a PC (not shown) which mathematically decodes the output of the detector 10 using its knowledge of the mask pattern, and reconstructs the image.

The invention claimed is:

1. Apparatus for imaging an object on the remote side of a barrier comprising mask means having at least one radiation transparent area, source means for projecting a scanning beam of radiation through the mask and the barrier and onto the object, detector means for detecting radiation scattered from any scanned point on the object, and image generation means for generating an image of the object from the detected radiation.

2. Apparatus according to claim 1 wherein the mask means has a plurality of radiation transparent areas arranged in a predetermined pattern thereby to project on to the object a plurality of scanning beams of radiation of a predetermined pattern.

3. Apparatus according to claim 1 wherein the source means is scanned through a two-dimensional array of 1024× 1024 positions.

4. Apparatus according to claim 3 wherein the mask pattern is selected, according to a mathematical function, thereby to code the scanning beams projected on to the object in a manner which will result in reflected radiation that can be subsequently decoded.

5. Apparatus according to claim 1 which is portable.

6. Apparatus according to claim 1 wherein the radiation is back-scattered from the object.

7. Apparatus according to claim 1 wherein the source means scans the object with x-ray radiation.

8. Apparatus according to claim 7 wherein the source means comprises an x-ray raster scan tube or an RGX tube.

9. Apparatus according to claim 7 wherein the detector means comprises a segmented array of scintillation crystals read out by a plurality of photomultiplier tubes.

10. Apparatus according to claim 1 wherein the detector means is generally annular and positioned around the source means.

* * * * *